United States Patent
Hsu et al.

(10) Patent No.: US 7,257,489 B2
(45) Date of Patent: *Aug. 14, 2007

(54) QUADRUPOLE ACOUSTIC SHEAR WAVE LOGGING WHILE DRILLING

(75) Inventors: Chaur-Jian Hsu, Danbury, CT (US); Jahir A. Pabon, Brookfield, CT (US); Bikash K. Sinha, West Redding, CT (US); Sergey Asvadurov, Moscow (RU)

(73) Assignee: Schlumberger Technology Corporation, Ridgefield, CT (US)

( * ) Notice: Subject to any disclaimer, the term of this patent is extended or adjusted under 35 U.S.C. 154(b) by 179 days.

This patent is subject to a terminal disclaimer.

(21) Appl. No.: 10/488,160

(22) PCT Filed: Sep. 9, 2002

(86) PCT No.: PCT/US02/28604

§ 371 (c)(1),
(2), (4) Date: Aug. 26, 2004

(87) PCT Pub. No.: WO03/027713

PCT Pub. Date: Apr. 3, 2003

(65) Prior Publication Data

US 2005/0000688 A1    Jan. 6, 2005

(51) Int. Cl.
*G01V 1/40*    (2006.01)
*G01V 3/00*    (2006.01)

(52) U.S. Cl. ........................ 702/6; 340/854.4

(58) Field of Classification Search ............... 702/6, 702/7; 340/854.4, 855.5, 856.4, 854.5, 854.3; 367/25, 31, 35; 166/254.2
See application file for complete search history.

(56) References Cited

U.S. PATENT DOCUMENTS

| 4,649,526 A | 3/1987 | Winbow et al. ............. 367/35 |
| 4,685,091 A | 8/1987 | Chung et al. ............... 367/31 |
| 4,791,619 A | 12/1988 | Liu ............................ 367/35 |

(Continued)

FOREIGN PATENT DOCUMENTS

EP    0 778 473 A2    6/1997

(Continued)

OTHER PUBLICATIONS

Chen, S. T. "Shear-Wave Logging with Quadrupole Sources". *Geophysics*, vol. 54, No. 5 (May 1989), pp. 590-597.

(Continued)

*Primary Examiner*—John Barlow
*Assistant Examiner*—Toan M. Le
(74) *Attorney, Agent, or Firm*—Vincent P. Loccisano; Jody Lynn Destefanis; William B. Batzer

(57) ABSTRACT

A tool generates signals indicative a shear wave slowness of the formation surrounding a borehole. The tool comprises a collar portion adapted for mounting in a drill string, a quadrupole sonic transmitter mounted to the collar portion, and a quadrupole sonic receiver array mounted to the collar spaced apart from the transmitter. A method determines shear wave slowness of the formation. The method includes propagating quadrupole wave energy into the formation and detecting quadrupole dispersive waveform received at a second location. Formation shear wave slowness is calculated using dispersive slowness time coherence processing.

28 Claims, 8 Drawing Sheets

U.S. PATENT DOCUMENTS

| | | | | |
|---|---|---|---|---|
| 4,932,003 | A | * | 6/1990 | Winbow et al. ............. 367/75 |
| 4,951,267 | A | | 8/1990 | Chang et al. ................. 367/31 |
| 5,027,331 | A | | 6/1991 | Winbow et al. ............. 367/75 |
| 5,030,873 | A | | 7/1991 | Owen .......................... 310/337 |
| 5,077,697 | A | | 12/1991 | Chang .......................... 367/31 |
| 5,278,805 | A | | 1/1994 | Kimball ....................... 367/32 |
| 5,510,582 | A | | 4/1996 | Birchak et al. ............. 181/102 |
| 5,587,966 | A | | 12/1996 | Kimball et al. .............. 367/31 |
| 5,594,706 | A | | 1/1997 | Shenoy et al. ................ 367/76 |
| 5,753,812 | A | * | 5/1998 | Aron et al. ............. 73/152.47 |
| 5,796,677 | A | * | 8/1998 | Kostek et al. ................ 367/25 |
| 5,852,587 | A | | 12/1998 | Kostek et al. ................ 367/25 |
| 5,936,913 | A | | 8/1999 | Gill et al. ..................... 367/25 |
| 5,971,095 | A | | 10/1999 | Ozbek ......................... 181/112 |
| 5,999,484 | A | | 12/1999 | Kimball et al. .............. 367/31 |
| 6,082,484 | A | | 7/2000 | Molz et al. ................. 181/102 |
| 6,084,826 | A | | 7/2000 | Legett, III ................... 367/82 |
| 6,366,531 | B1 | | 4/2002 | Varsamis et al. ............ 367/26 |
| 6,427,124 | B1 | | 7/2002 | Dubinsky et al. ............. 702/9 |
| 6,449,560 | B1 | | 9/2002 | Kimball ......................... 702/6 |
| 6,552,962 | B1 | | 4/2003 | Varsamis et al. ............ 367/25 |
| 6,581,010 | B2 | | 6/2003 | Dubinsky et al. ............. 702/9 |
| 6,614,360 | B1 | | 9/2003 | Legett, III et al. ....... 340/853.1 |
| 6,631,327 | B2 | * | 10/2003 | Hsu et al. ...................... 702/6 |
| 6,850,168 | B2 | * | 2/2005 | Tang et al. ............. 340/854.4 |
| 6,930,616 | B2 | * | 8/2005 | Tang et al. ............. 340/854.4 |
| 6,985,086 | B2 | * | 1/2006 | Tang et al. ............. 340/854.4 |
| 7,099,810 | B2 | * | 8/2006 | Mandal ......................... 703/8 |
| 2002/0113717 | A1 | | 8/2002 | Tang et al. ............. 340/854.4 |

FOREIGN PATENT DOCUMENTS

WO     WO 02/39143 A2     5/2002

OTHER PUBLICATIONS

Chen, S. T. et al. "Compressional and Shear-Wave Logging in Open and Cased Holes Using a Multipole Tool", *Geophysics*, vol. 56, No. 4 (Apr. 1991), pp. 550-557.

Harrison, A. R. et al. "Acquisition and Analysis of Sonic Waveforms from a Borehole Monopole and Dipole Source for the Determination of Compressional and Shear Speeds and Their Relation to Rock Mechanical Properties and Surface Seismic Data". *SPE 20557* (1990). pp. 267-282.

Hsu, C-J et al. "Mandrel Effects on the Dipole Flexural Mode in a Borehole". *J. Acoust. Soc. Am.*, vol. 104, No. 4, (Oct. 1998), pp. 2025-2039.

Kurkjian, A. L. et al. "Acoustic Multipole Sources in Fluid-filled Boreholes". *Geophysics*, vol. 51, No. 1 (Jan. 1986), pp. 148-163.

Lang, et al. "Estimating Slowness Dispersion from Arrays of Sonic Logging Waveforms". *Geophysics*, vol. 52, No. 4, (Apr. 1987), pp. 530-544.

Rao, V. N. Rama et al. "Acoustics of Fluid-filled Boreholes with Pipe: Guided Propagation and Radiation". *J. Acoust. Soc. Am.*, vol. 105, No. 6, (Jun. 1999), pp. 3057-3066.

Yilmaz, O. "Seismic Data Processing", (1987). pp. 69-79.

Tang, X.M. et al. Shear-Velocity Measurement in the Logging-While-Drilling Environment: Modeling and Field Evaluations. Paper RR. *SPWLA 43rd Annual Logging Symposium* (Jun. 2-5, 2002).

Borre, M. et al. Fluid Substitution in Horizontal Chalk Wells and its Effects on Acoustic Rock Properties—A Case Study Comparing Logging While Drilling and Wireline Acoustic Data. Paper T. *SPWLA 45th Annual Logging Symposium* (Jun. 6-9, 2004).

\* cited by examiner

SECTION X-X

QUADRUPOLE ACOUSTIC SHEAR WAVE LOGGING WHILE DRILLING

TECHNICAL FIELD

The present invention relates to apparatus and methods for oil field acoustic logging while drilling.

BACKGROUND OF THE INVENTION

In the oil and gas industry, underground formations are probed and characterized by well logging tools. Acoustical properties of a formation, such as compressional (P) and shear (S) wave speeds, are measured with sonic tools and have applications in seismic correlation, petrophysics, rock mechanics and other areas. Traditionally, these measurements are conducted after or in between drilling and are called wireline logging. In wireline logging, sonic monopole tools are used to measure P in all formations and S in fast formations; sonic dipole tools are used to measure S in both fast and slow formations (Kurkjian and Chang, 1986). Exxon reported experimental work on the concept of wireline quadrupole tools (Chen 1989, Chen and Eriksen 1991, Winbow etc. 1991). In the last decade there has been a trend towards measuring the rock properties while drilling is taking place, that is Logging While Drilling or LWD. Schlumberger's ISONIC tool is an example of such LWD tools. The ISONIC is a monopole sonic tool. Other companies in the industry have commercialized combined monopole and dipole LWD tools. For all sonic tools, tool borne energy, which contains no information about the formation, is sought to be removed or attenuated. For wireline tools, the tool waves are reduced with designs such as slotted sleeves, isolation joints and flexible tool structures. For LWD tools, tool waves carried by the prominent and stiff tool body, which is essentially the drill collar with sensors and electronics mounted on it, is a more serious challenge; hence deriving formation P and S speeds from LWD data is not nearly as straightforward as in wireline.

A sonic tool has usually one or more sources and multiple receivers. There are multiple paths for the acoustic energy emitted by the source to reach the receivers. The part of acoustic energy propagating through the formation and mud provides useful information for characterizing the formation. The part of acoustic energy propagating through the tool body does not contain useful information and is sought to be removed.

A monopole logging tool, wireline or LWD, employs single or multiple monopole acoustic source(s) as well as receivers; they transmit and detect acoustic energy uniformly in all azimuthal directions in the plane perpendicular to the tool axis. It is well understood based on wave propagation theory that a monopole tool can excite and detect P and Stoneley waves in all formations, regardless of formation speed. In addition, a monopole tool is capable of generating and detecting S waves in fast formations where the formation shear speed is faster than the sound speed in the mud. In wireline monopole tools, the tool borne energy is delayed and suppressed by techniques such as slotted receiver housings and/or damping. In LWD monopole tools, dealing with the tool waves is a more difficult issue. Schlumgerber's ISONIC tool achieves tool wave attenuation over a selected frequency band with a specially designed periodic array of grooves machined on the collar section between the transmitter and receivers. This technique is disclosed in U.S. Pat. No. 5,852,587 to Kostek et al., issued Dec. 22, 1998.

A dipole tool generates and receives the flexural mode in a borehole surrounded by a formation. The term "Dipole" refers to the azimuthal profile $\cos\theta$ for the transmitter, receivers and the acoustic field associated with the flexural mode. The flexural mode propagation asymptotes to the formation shear speed at the low frequencies, and to the mud-formation interface wave speed at high frequencies. Thus S wave speed of the formation can be derived from the measured flexural mode (Kurkjian and Chang 1986). Wireline dipole tools use flexible (i.e. acoustically slow) or acoustically transparent housings for receivers to minimize or avoid tool effects on the measured borehole flexural mode, in other words, to approximate the fluid-filled (no tool) borehole condition. These tools are also designed with some form of acoustic isolator or attenuator between the source and receivers to reduce the excitation of tool waves.

Applying the wireline dipole shear technique to LWD encounters serious challenge of tool wave interference. LWD tools can not be made very flexible or slow as wireline tools because of tough drilling conditions in which LWD tools need to operate. The body of an LWD tool, essentially a drill collar, provides a propagation path of acoustic energy between the acoustic source and receivers. Both borehole flexural and tool flexural waves are present in similar frequency and slowness ranges and thus can not be easily separated. In addition, the presence of the tool alters the borehole mode from the no tool condition; the alteration is the most substantial under conditions where the borehole and tool flexural waves are close in speed (Hsu and Sinha 1998, Rao and Vandiver 1999). These two coexisting borehole and tool flexural modes can be predicted by modeling. However, to extract formation shear from these altered modes is much more difficult and less robust than extracting shear in the wireline situation where only the borehole flexural mode is present. One typical approach to alleviate the problem is to attenuate the tool borne energy with attenuators placed in the drill collar in between the transmitter and receivers (Birchak etc 1996, Molz and Leggett 2000). However, even if the tool borne energy is substantially attenuated and becomes weaker than the borehole flexural mode signal, the resultant dispersion of the borehole flexural mode will typically not asymptote to the formation shear speed. This can significantly reduce the accuracy of extracting formation shear from the data.

Borehole quadrupole mode has similar dispersion characteristics as that of the borehole dipole mode, with the quadrupole dispersion taking place at higher frequencies relative to the dipole mode. Quadrupole refers to the azimuthal profile $\cos 2\theta$ of transmitter, receivers, and acoustic field associated with the quadrupole modes. Both dipole and quadrupole modes asymptote to the fluid-formation interface wave speed at high frequencies and to the formation shear speed at low frequencies. More specifically, the quadrupole mode actually crosses the shear speed; however, there is practically no energy at frequencies below the crossing point. Exxon reported on a wireline quadrupole experimental tool for S wave measurement (Chen 1989, Chen and Eriksen 1991, Winbow etc. 1991). This tool is disclosed in U.S. Pat. No. 4,932,003 to Winbow et al., issued Jun. 5, 1990, and in U.S. Pat. No. 5,027,331 to Winbow et al., issued Jun. 25, 1991. In the Exxon experimental quadrupole tool, an acoustic isolator between source and receivers was mentioned, and no consideration of tool effect was reported.

SUMMARY OF THE INVENTION

The present invention provides, in a preferred embodiment, a tool for generating signals indicative of shear wave slowness of the formation surrounding a borehole containing a fluid and a drill string. The tool is adapted for use with a drill string having a plurality of drill collars jointed together. The tool comprises: a collar portion defining an axis and adapted for mounting in a drill string; one or more quadrupole sonic transmitters mounted to the collar portion at a first location; and a quadrupole sonic receiver array mounted to the collar portion at a second location, the second location spaced apart from the first location.

The transmitter is preferably embedded in an annular groove in said collar portion. The receiver array includes an axial array of transducers, each transducer embedded in an annular groove in said collar portion. The transmitter and receiver are adapted for mounting to a thick wall drill collar.

The tool also includes electronics, mounted within said collar portion, for converting signals indicative of shear wave slowness of the formation into digital data indicative of shear wave slowness of the formation; receiver electronics with means for storing said digital data; and means for downhole processing and transmitting formation shear slowness data to the surface by mud-pulse or other suitable drill-string telemetry.

The present invention also provides a quadrupole sonic transmitter, for use in a tool for generating signals indicative of shear wave slowness of the formation surrounding a borehole containing a fluid and a drill string, the tool adapted for use in a drill string having a plurality of drill collars jointed together, said tool having a collar portion defining an axis, said quadrupole sonic transmitter having an azimuthal array of four equally spaced transducer quadrants, each quadrant including at least one electro-acoustical transducer element. In a preferred embodiment, each quadrant includes a quarter-circle array of piezoelectric transducer elements, the elements of the four quadrants collectively arranged as a quadrupole piezoelectric ring transducer. Each quadrant has a predefined acoustic power output profile across the elements of each quarter-circle array, such that the elements of the four quadrants collectively produce an acoustic wave that approximates the quadrupole profile of $\cos 2\theta$. The output of these elements can be shaped to approximate this quadrupole profile more closely by varying the physical size of these elements or varying the driving voltage of these elements following the $\cos 2\theta$ azimuthal pattern. The transmitter is adapted for embedding within a protective encapsulating material in an annular groove in the collar portion of said tool.

In one alternative embodiment, each transducer quadrant includes a stack of piezoelectric elements.

In another alternative embodiment, each transducer quadrant includes at least one pressure balanced backing bender transducer.

In another alternative embodiment, each transducer quadrant includes at least one magnetostrictive transducer.

In another alternative embodiment, each transducer quadrant includes at least one electro-dynamic transducer.

The present invention also provides a quadrupole sonic receiver, for use in a tool for generating signals indicative of shear wave slowness of the formation surrounding a borehole containing a fluid and a drill string, the tool adapted for use in a drill string having a plurality of drill collars jointed together, said tool having a collar portion defining an axis, said quadrupole sonic receiver having an azimuthal array of four equally spaced transducer quadrants, each quadrant including at least one electro-acoustical transducer element. In a preferred embodiment, each quadrant includes a quarter-circle array of piezoelectric transducer elements, the elements of the four quadrants collectively arranged as a quadrupole piezoelectric ring transducer. Each element of each quadrant has a predefined sensitivity profile across the elements of each quarter-circle array, such that the elements of the four quadrants collectively produce an acoustic wave sensitivity that approximates the quadrupole profile of $\cos 2\theta$. The receiver is adapted for embedding within a protective encapsulating material in an annular groove in the collar portion of said tool.

In alternative embodiments the transducer quadrant includes either a stack of piezoelectric elements, or at least one pressure balanced backing bender transducer, or at least one magnetostrictive transducer, or at least one electro-dynamic transducer.

Another alternative but not preferred embodiment is to have receiver transducers sensing the pressure only around a selected azimuthal angle, for example, aligned with one of the four quadrants of the transmitter. Such a receiver array has much less capability in rejecting other spurious modes.

A system is provided for determining shear wave slowness of the formation surrounding a borehole, the borehole containing a fluid, the system comprising: a tool for generating signals indicative of formation shear wave slowness, the tool having a collar portion defining an axis and adapted for mounting in a drill string, a quadrupole sonic transmitter mounted to the collar portion at a first location, and a quadrupole sonic receiver array mounted to the collar portion at a second location, the second location spaced apart from the first location; and computing means for calculating formation shear wave slowness from said signals. Dispersive wave processing includes means for dispersive slowness time coherence processing.

The present invention provides a method for determining shear wave slowness of the formation surrounding a borehole containing a drill string and a fluid, the method comprising: propagating quadrupole wave energy into the formation from a first location on the drill string; detecting quadrupole dispersive waveforms in a receiver array at a second location on the drill string at a distance from the first location to obtain digital data indicative of shear wave slowness of the formation; and calculating formation shear wave slowness from said digital data. Calculating formation shear wave slowness includes dispersive wave processing. Dispersive wave processing includes dispersive slowness time coherence processing. Calculating formation shear wave slowness includes: a) filtering the recorded signals to remove the collar quadrupole mode from the data, b) Fourier transforming at least a portion of said signals to obtain Fourier transformed signals; c) backpropagating said Fourier transformed signals utilizing a plurality of pre-computed, model-based quadrupole dispersion curves to obtain a plurality of sets of backpropagated signals; d) stacking said backpropagated signals of each set to provide stacked sets; and e) using said stacked sets to determine formation shear wave slowness.

In one embodiment, the method uses formation quadrupole dispersive waveforms having a range of frequencies whose maximum frequency is approximately equal to the cut-off frequency for collar quadrupole mode propagation, and whose minimum frequency is approximately equal to the frequency at which formation quadrupole mode is expected to propagate at a slowness approximately equal to the formation shear slowness.

The method uses a pre-selected range of frequencies, for example 4-8 kHz, depending on the tool size and, if available, the expected formation slowness. The method uses filtering for formation quadrupole mode data, wherein filtering includes frequency domain filtering, slowness domain filtering, or frequency-slowness domain (two dimensional) filtering.

The present invention provides a method for determining shear wave slowness in formation surrounding a borehole containing a drill string and a fluid, the method comprising: a) obtaining from a plurality of sonic detectors, quadrupole pressure data indicative of formation shear wave slowness; b) Fourier transforming at least a portion of said data to obtain Fourier transformed signals; c) backpropagating said Fourier transformed data utilizing a plurality of quadrupole dispersion curves to obtain propagated data representing a plurality of sets of backpropagated signals; d) stacking said backpropagated data to provide stacked sets data; and e) processing said stacked sets data to determine formation shear wave slowness.

DETAILED DESCRIPTION

General

Figure 1:
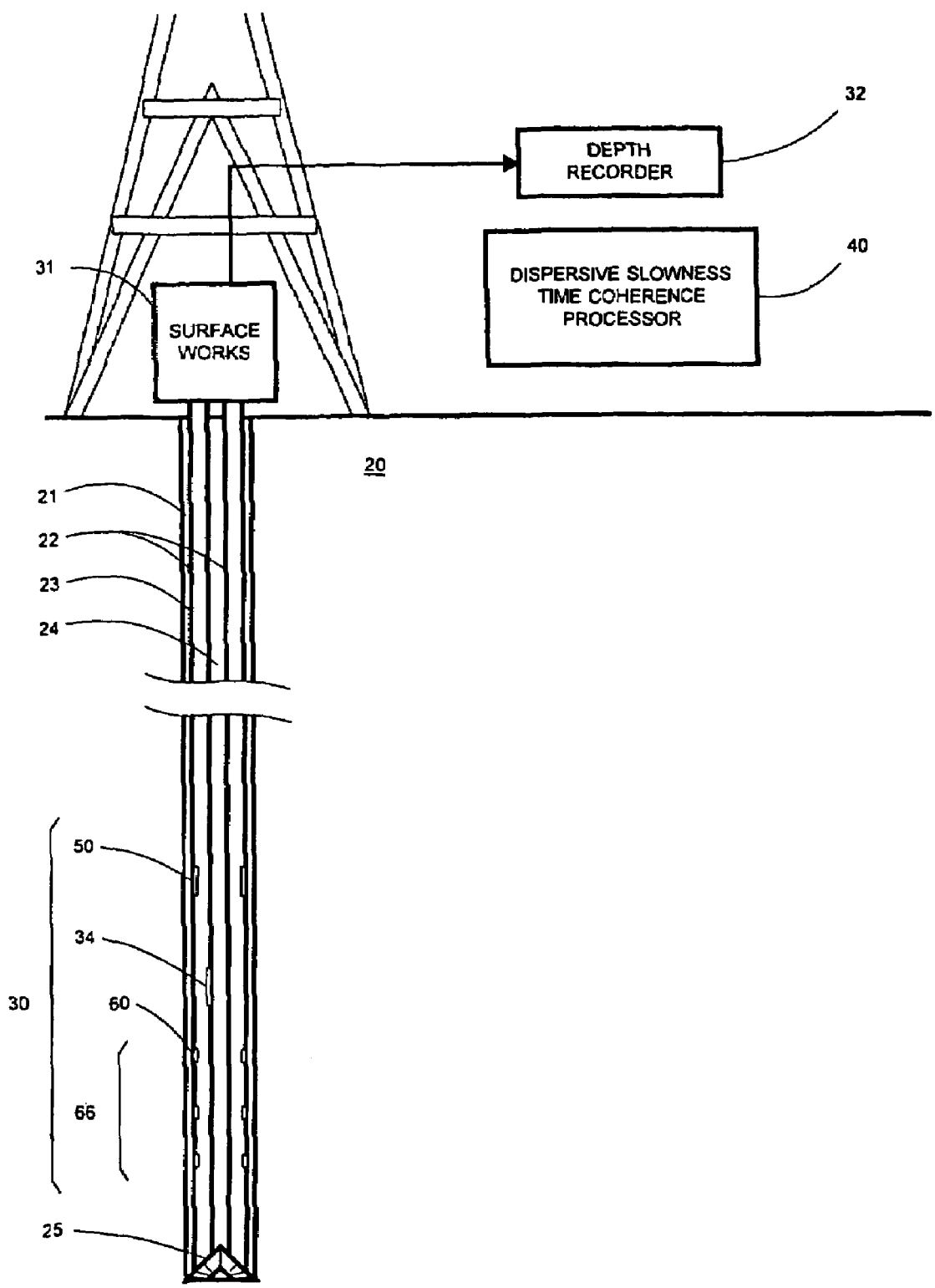
FIG. 1 is a schematic elevation view of a first embodiment of the system of the present invention with an LWD quadrupole acoustic logging tool located in a drill string in a borehole, and a dispersive slowness time coherence processor at the surface.

The present invention is based on the inventors' discovery and experimental verification that for LWD acoustic shear wave logging the use of quadrupole mode offers significant and previously unknown advantages over the use of monopole and dipole modes. The inventors discovered that:

a) dispersion (speed as a function of frequency) of the collar of a drill string is significantly different in the quadrupole mode from what it is in the dipole mode;

b) with a stiff collar, over the frequency range in which the quadrupole mode propagates in both a formation and the collar of a drill string, the collar quadrupole mode (quadrupole energy propagating primarily in the collar of the drill string) is significantly faster than the formation quadrupole mode (quadrupole energy propagating primarily in the mud outside the collar and in the formation surrounding the borehole); and c) the collar quadrupole mode is non-propagating below a collar cut-off frequency and has very weak excitation around the cut-off frequency, the frequency band of the formation quadrupole mode usually extends below and above that collar cut-off frequency approaches the formation shear slowness at a lower frequency, with negligible energy at even lower frequencies. Thus there is a clear separation between the formation and collar quadrupole modes. This separation of formation and collar modes is not typically achievable with dipole excitation.

The inventors recognized that because of these differences, formation shear velocity measurements made using quadrupole mode excitation would suffer much less collar interference than would measurements made using dipole mode excitation.

The inventors also recognized that the preferred tool embodiment using quadrupole mode excitation with quadrupole mode transmitters and quadrupole mode receivers is simply a stiff collar, i.e., a collar of sufficient wall thickness, and that a conventional "thick collar" is close to ideal.

The inventors further recognized that quadrupole dispersive wave processing could be applied to the received quadrupole mode waves to extract formation shear slowness.

Accordingly, the present invention provides an LWD apparatus including at least one electro-acoustic quadrupole mode transmitter and at least one electro-acoustic quadrupole mode receiver array mounted to the collar spaced-apart in a drill string. Receiver electronics, located proximate to the receiver array, is used to convert signals from the receiver array indicative of shear wave slowness of the formation into digital data, and to store and process these data. Preferably, a dispersive slowness time coherence (DSTC) method is used to process the data to determine formation shear wave slowness. Preferably, the data can be processed downhole with results transmitted in real time by drill string telemetry to the surface. Alternatively, or additionally, the stored data are retrieved and processed at the surface.

FIRST PREFERRED EMBODIMENT

A first preferred embodiment of the apparatus of the present invention is illustrated in FIGS. 1-4.

FIG. 1 shows an LWD system for determining formation shear wave slowness including a quadrupole mode transmitter, a quadrupole mode receiver array, and receiver electronics, all located at the drill string, and a dispersive slowness time coherence processor at the surface.

The transmitter generates a quadrupole pressure wave that excites formation quadrupole and collar quadrupole waves propagating along the axial direction of the borehole. The receiver array receives quadrupole waves and generates signals indicative of shear wave slowness of the formation. Receiver electronics converts these signals into digital data, store and process the data. The data storage is necessary because even in the event that the data is processed downhole there is usually the need for more extensive and refined processing at the surface after the tool is retrieved.

In the first preferred embodiment, the data are processed by a downhole processor immediately after recording. The processing technique is by a dispersive slowness time coherence (DSTC) technique or quick DSTC (QDSTC) technique. Dispersive slowness time coherence (DSTC) and QDSTC techniques are disclosed in U.S. Pat. No. 5,278,805 to Kimball, issued Jan. 11, 1994. U.S. Pat. No. 5,278,805 is hereby incorporated herein by reference.

In an alternative embodiment, following retrieval of tool and its stored data from the borehole, the data are processed in a processor at the surface using the DSTC or QDSTC technique.

During drilling of the formation, the borehole contains a drill string immersed in drilling mud. FIG. 1 shows earth formation 20 with a borehole 21. Borehole 21 encloses drill string 22. Drill string 22 defines string outer surface 23 and mud channel 24. LWD tool 30 includes electro-acoustic quadrupole transmitter 50, electro-acoustic quadrupole receiver array 66, and receiver electronics 34.

Surface works 31 includes drill string support and drive mechanisms (not shown). Batteries or mud motor (not shown) in tool 30 provide electrical power to transmitter 50 and receiver electronics 34. The drill string provides depth data to depth recorder 32. Depth is recorded in depth recorder 32. In the preferred embodiment, using conventional techniques, depth recorder 32 and receiver electronics 34 each include a clock, and both depth and signal data are recorded with time. Dispersive slowness time coherence processor 40 performs dispersive slowness time coherence processing on digital data from the tool and uses recorded time data to associate depth data with signal data.

Figure 2:
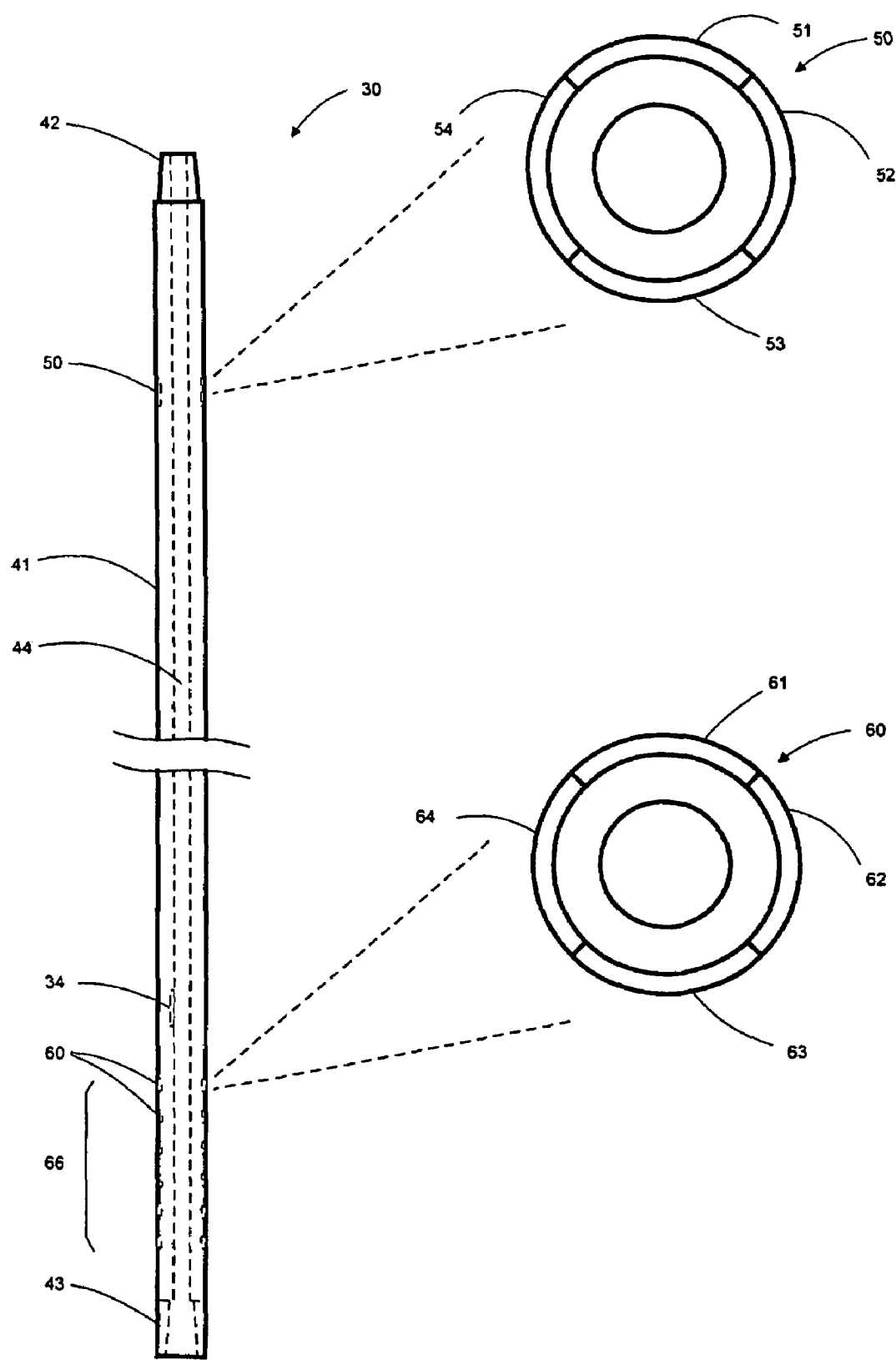
FIG. 2 is an enlarged elevation view of the tool of the first embodiment showing selected interior components including a quadrupole transmitter, a quadrupole receiver array, and receiver electronics, also showing the four quadrants of the quadrupole transmitter and one of the quadrupole receivers in schematic axial view.
Figure 3:
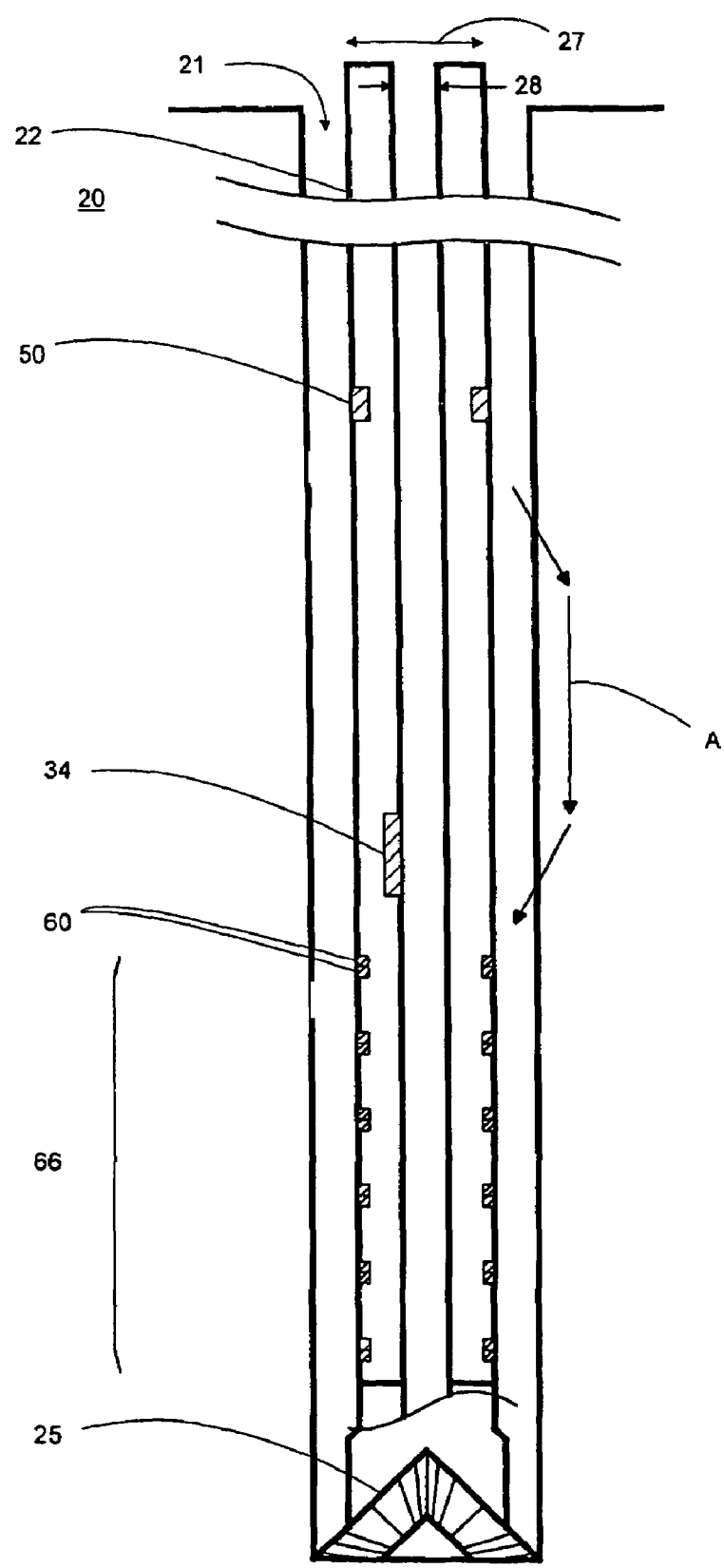
FIG. 3 is an enlarged schematic cross section view of the tool of the first embodiment in the borehole and attached to a drill bit.

FIG. 2 shows schematically selected components of an LWD tool 30 of the present invention. Drill string 22 of FIG. 1 includes a plurality of drill collars. Tool 30 has the general shape of a drill collar, including a pipe portion 41, a male threaded end 42 and a female threaded end 43. Pipe portion 41 defines mud channel 44. Like a drill collar, tool 30 is typically approximately 9 meters (30 feet) long and approximately 10-20 cm (4 to 8 inches) in outside diameter. Referring again to FIG. 1, multiple collars and tool 30 are connected to form drill string 22. Tool 30 is connected within the drill string above drill bit 25.

FIG. 2 shows LWD tool 30 having a quadrupole transmitter 50 and a quadrupole receiver array 66 spaced apart. Quadrupole transmitter 50 and the several, possibly six, quadrupole receivers 60 of quadrupole receiver array 66 are preferably each embedded in a circumferential groove in outer surface 43 of the tool. Preferably, transmitter 50 is a piezoelectric ring transducer having four quadrants shown in FIG. 2 as 51-54. The ring transducer may be made as two halves or four quadrants so that two or four pieces of the transmitter could be inserted in a circumferential groove of the drill collar. The transmitter pieces are embedded in epoxy or similar material to hold them in place and to provide mechanical protection against drilling environment.

Likewise, each quadrupole receiver 60 is assembled from pieces and embedded in epoxy or similar material.

Figure 4:
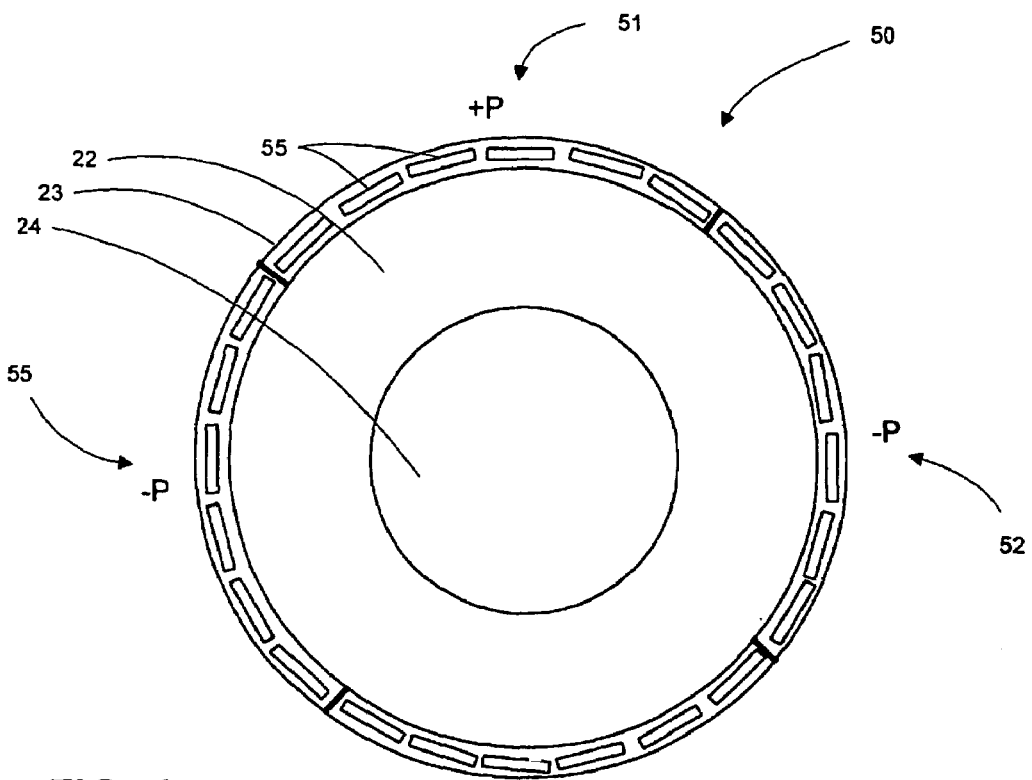
FIG. 4 is a schematic axial view of the piezoelectric quadrupole ring transducer of the transmitter of the first embodiment.

Transmitter 50 of the first embodiment is illustrated schematically in FIGS. 1-4. FIG. 4 shows transmitter 50 comprising a single quadrupole piezoelectric ring transducer. Transmitter 50 has four quadrants, each containing a quarter-circle array of piezoelectric transducer elements. FIG. 4 shows six piezoelectric transducer elements in each quadrant. In a preferred embodiment there would be at least nine elements per quadrant, a total of at least 36 with elements uniformly spaced around the azimuth. Thus there are four quadrants (51, 52, 53, and 54) equally spaced azimuthally. This arrangement provides a thin layer of elements (thereby requiring only a shallow groove), and uses all the available space (thereby maximizing acoustic power output). Each quadrant includes transducer elements all of the same polarity, thereby defining a quadrant polarity. In addition, the output of these elements can be shaped to approximated quadrupole profile more closely by designing the physical size or the driving voltage of individual elements according to the quadrupole pattern. Quadrants alternate in polarity, positive and negative azimuthally. Transmitter 50 transmits a quadrupole wave through the formation as shown by arrows A in FIG. 3, i.e. substantially along the axis of the borehole and the axis of the transmitter.

Receiver array 66 of the first embodiment is also illustrated schematically in FIGS. 1-4. Each receiver of receiver array 66 comprises a single quadrupole piezoelectric ring transducer having the same schematic form as the transmitter shown in FIG. 4. Thus the ring transducer of each receiver 60 of receiver array 66 has a quarter-circle array of piezoelectric transducer elements in each of four quadrants. The four quadrants 61-64 are shown in FIG. 2. FIG. 4 shows six piezoelectric transducer elements in each quadrant. In a preferred embodiment of the receiver there would be nine per quadrant, a total of 36 with elements azimuthally spaced at 10° intervals. The four quadrants (61, 62, 63, and 64) are equally spaced azimuthally. This arrangement provides a thin layer of elements (thereby requiring only a shallow groove), and uses all the available space (thereby maximizing receiver sensitivity). Each quadrant includes transducer elements all of the same polarity, thereby defining a quadrant polarity. Quadrants alternate in polarity, positive and negative azimuthally. Similar to quadrupole transmitters, the sensitivity of these receiver elements can also be shaped to approximate quadrupole profile more closely. Each ring transducer is capable of detecting a quadrupole shear wave refracted through the formation as shown by arrows A in FIG. 3.

Conventional components of the system of the present invention, including power supply, transmitter electronics, receiver electronics, and mud-pulse or other kind of telemetry, use prior art technologies well known in the industry.

Alternative Transmitters and Receivers

Figure 5:
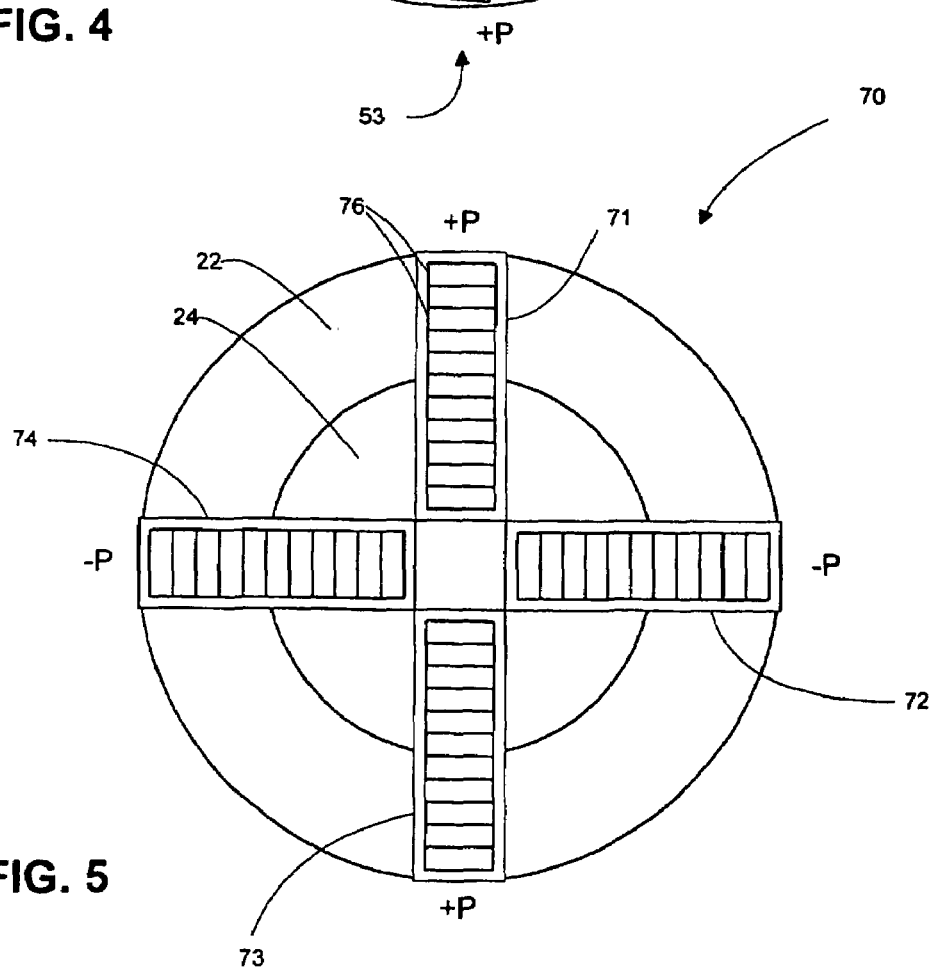
FIG. 5 is a schematic axial view of an alternative transducer, a piezoelectric quadrupole transducer with four radial stacks of piezoelectric elements.

A first alternative quadrupole transducer for use either as a transmitter or a receiver (but preferably as a transmitter) in the present invention is illustrated schematically in FIG. 5. FIG. 5 shows transmitter 70 as a 4-stack piezoelectric quadrupole transducer having four radial stacks (stacks 71, 72, 73, and 74) of piezoelectric transducer elements 76. The stacks are equally spaced azimuthally. FIG. 5 shows each stack having multiple transducer elements 76. Each stack includes multiple piezoelectric elements optimized for the available driving voltage and output power. Stacks alternate in polarity, positive and negative azimuthally as shown in FIG. 5. Other alternative quadrupole transducers include magnetostrictive transducers and electro-dynamic transducers.

Figure 6A:
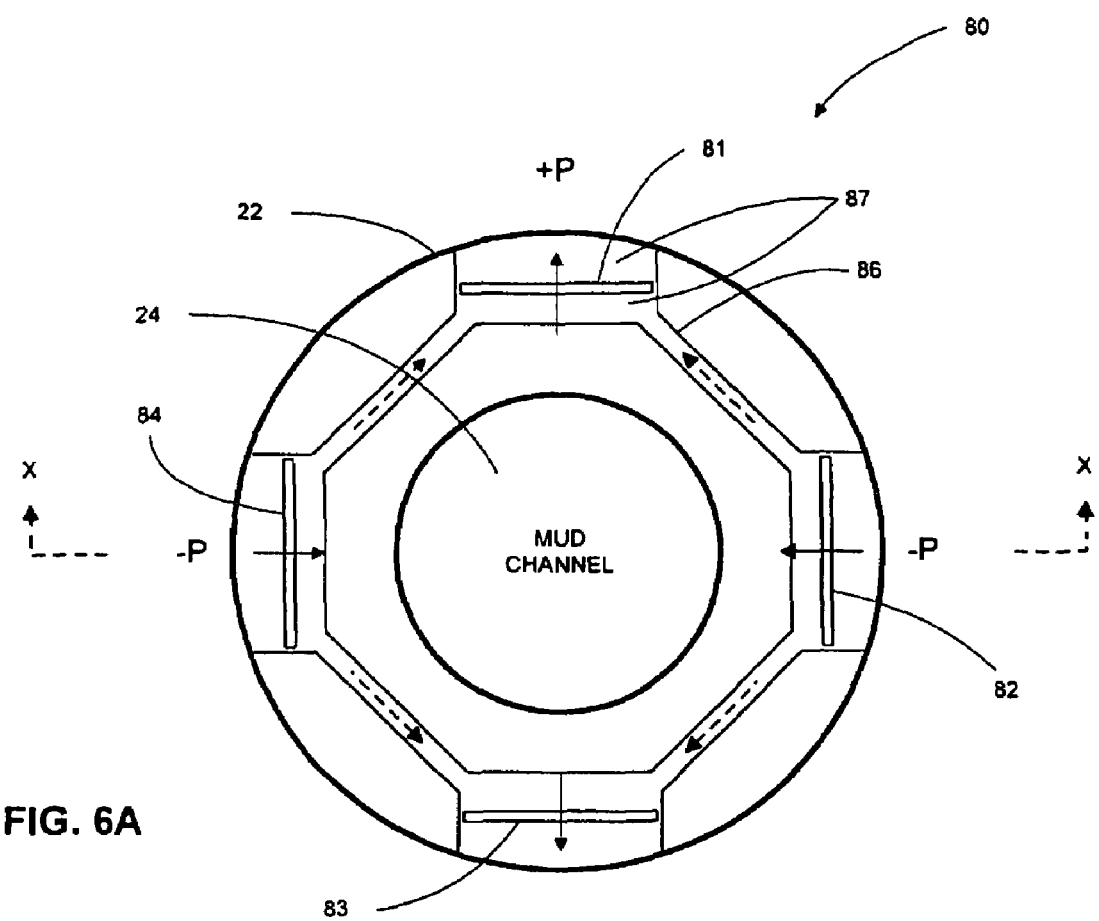
FIG. 6A is a schematic cross section axial view of another alternative transducer, a quadrupole bender transducer with pressure balanced backing.
Figure 6B:
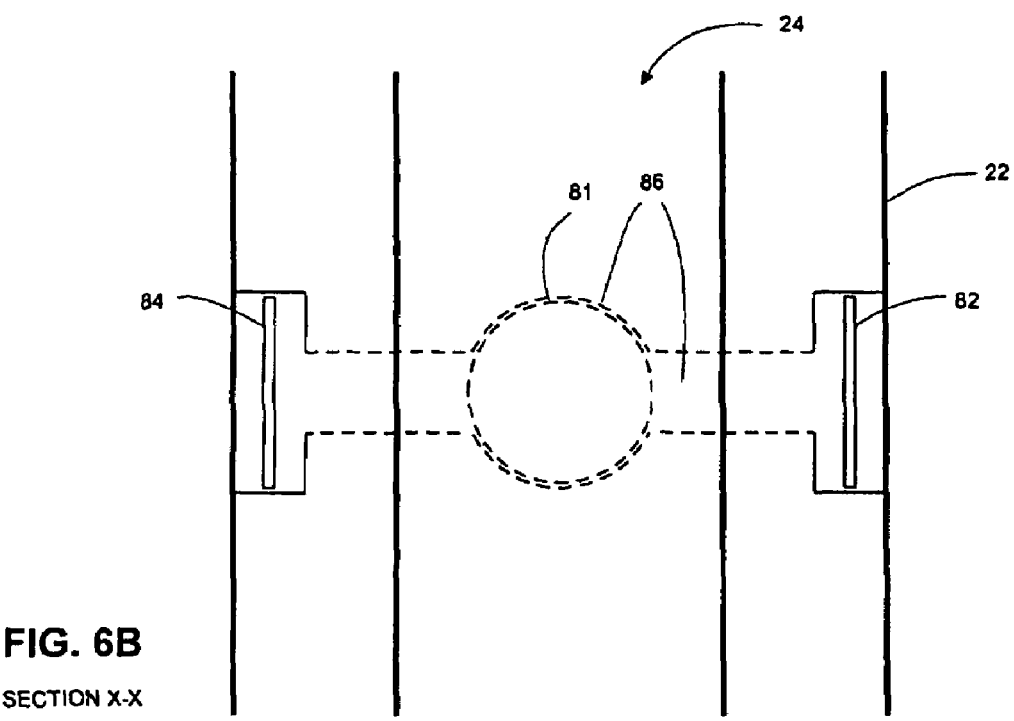
FIG. 6B is a schematic cross section elevation view of the transducer of FIG. 6A.

Another alternative quadrupole transducer for use either as a transmitter or a receiver (but preferably as a transmitter) in the present invention is illustrated schematically in FIGS. 6A and 6B. FIGS. 6A and 6B show quadrupole bender transmitter 80 with pressure balanced backing. Transmitter 80 has four disk-shaped bender elements 81-84 arranged to move radially. In the configuration shown in FIG. 3, transmitter 80 generates a quadrupole pressure wave that excites formation quadrupole and collar quadrupole waves propagating along the axial direction of the borehole. The wave path of interest passes through the formation as shown by arrows "A" in FIG. 3.

The pressure balanced backing configuration of transmitter 80 delivers energy efficiently to the formation. Bender elements 81-84 oscillate radially in directions consistent with quadrupole profile. The solid-line arrows show the directions of one snapshot. Conduits 86 and the space immediately surrounding bender elements 81-84 is filled with fill-fluid (preferably oil) 87. As elements 81 and 83 move outward, elements 82 and 84 move inward. Oil moving through the conduits in direction shown by the dashed-line arrows allows virtually all of the bender energy to be directed towards the formation.

Alternatively, any transmitter configuration that excites a measurable amount of quadrupole signals, as well as other order modes, may be utilized in accordance with the present invention. By way of example, a transmitter of FIG. 4 having elements 51 and 53, but not 52 and 54, may be used. Further, a transmitter of FIG. 5 having radial stacks 71 and 73, but not 72 and 74, may be used. Likewise, the transmitter of FIG. 6A may be adapted to include elements 81 and 83, but not 82 and 84. Such a configuration should preferably include a receiver capable of distinguishing quadrupole waves from other excited modes.

Method of the Invention

Figure 7:
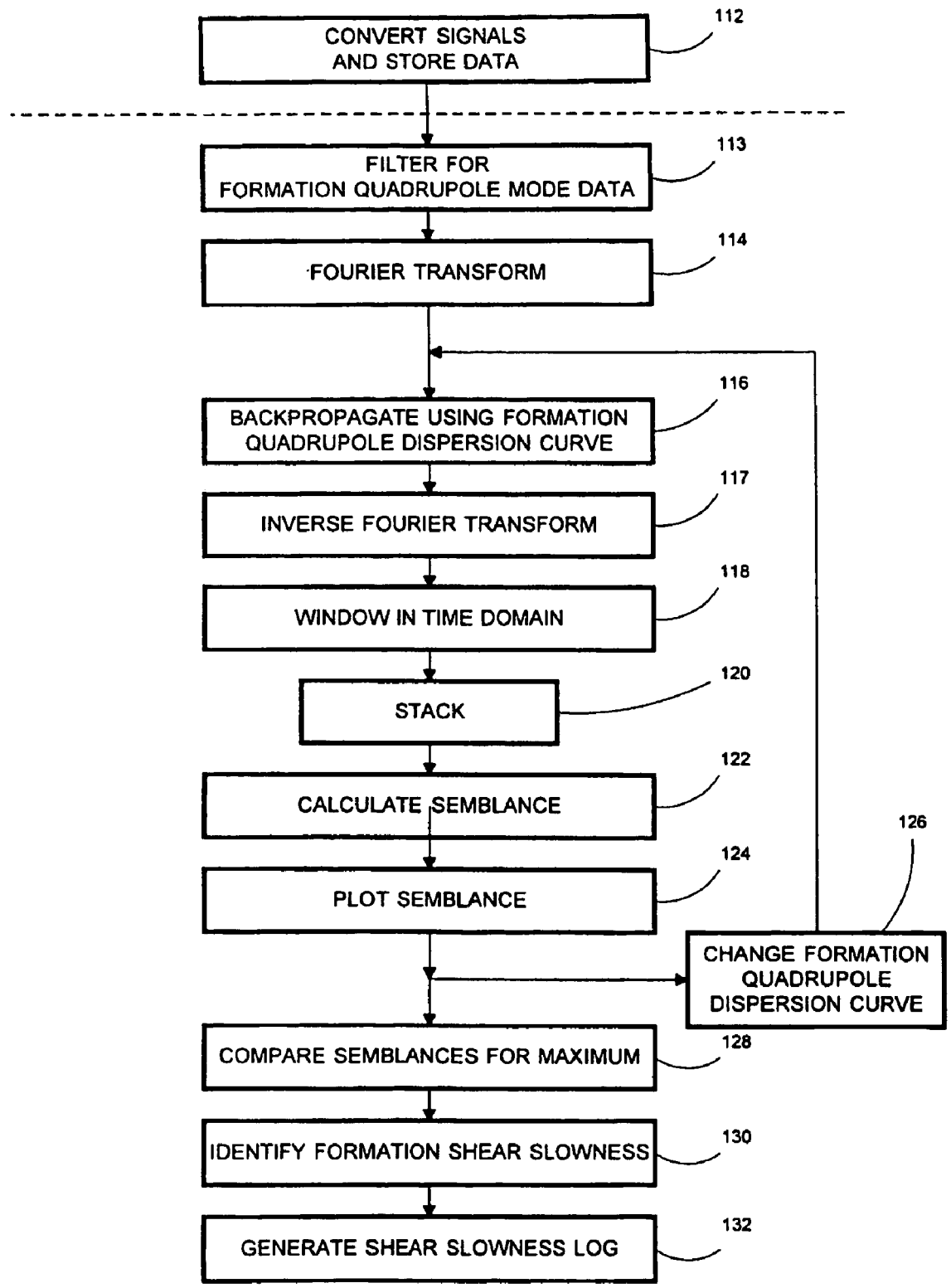
FIG. 7 is a flowchart illustrating a DSTC embodiment of the method of the present invention.
Figure 8:
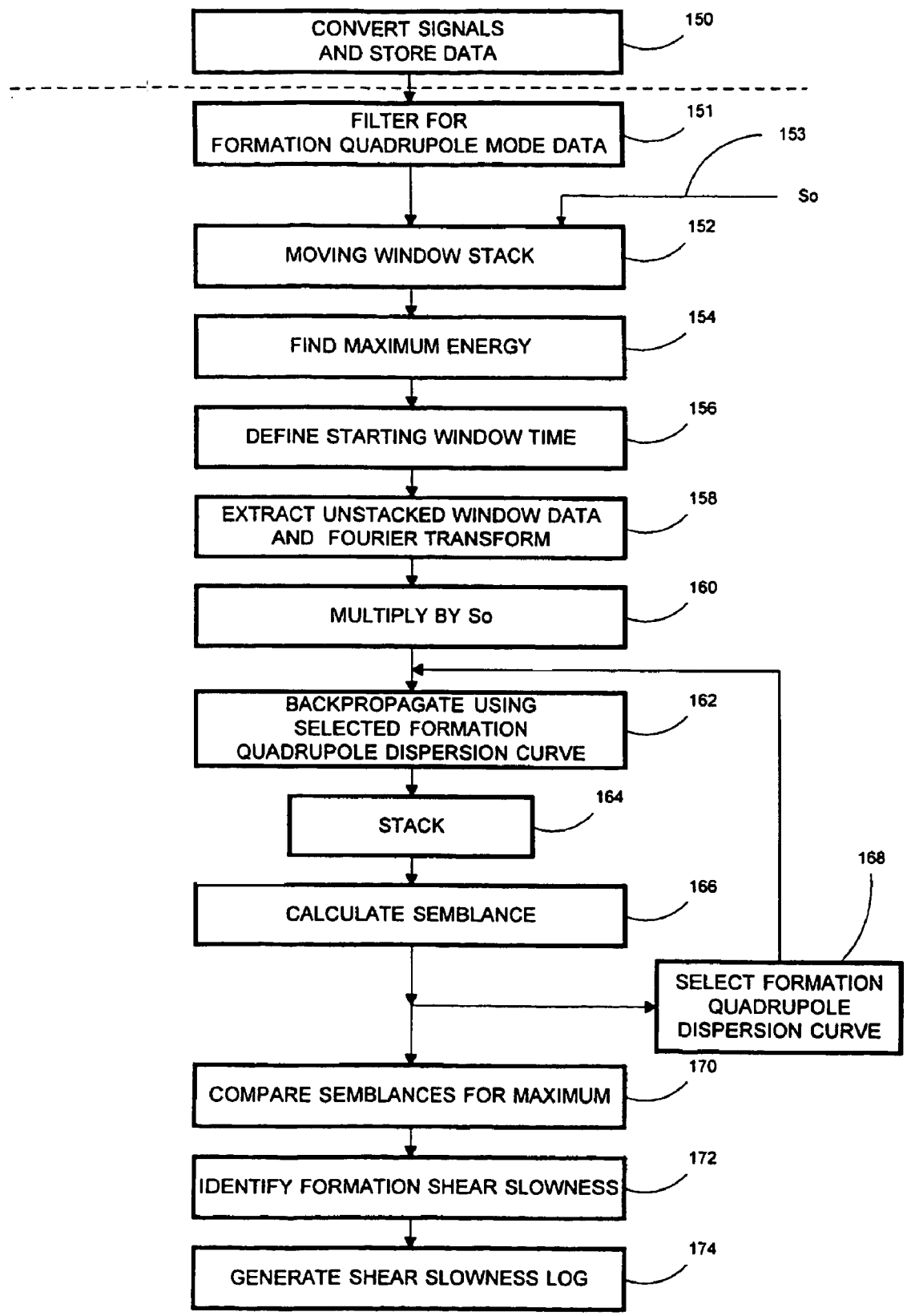
FIG. 8 is a flowchart illustrating a QDSTC embodiment of the method of the present invention.

In a first embodiment of the method of the invention, signal data is recorded in the receiver electronics (available for later surface processing) and is immediately processed downhole. Then dispersive wave processing is used to process the stored signal data to determine formation shear wave slowness. A preferred embodiment of the method of the invention uses a dispersive slowness time coherence (DSTC) processing as shown in FIG. 7. An alternative embodiment uses quick dispersive slowness time coherence (QDSTC) processing as illustrated in FIG. 8. These processes are described for processing monopole and dipole waves in U.S. Pat. No. 5,278,805, as noted herein above. DSTC and QDSTC processing is essentially the same for monopole waves, dipole waves and quadrupole waves.

As noted above, there are two acoustic transmission modes present in the system of the present invention using quadrupole excitation in the frequency band of interest. The two modes are formation quadrupole mode and collar quadrupole mode. These two modes are coupled, though the collar mode is relatively insensitive to formation properties. Both modes are dispersive.

Figure 9:
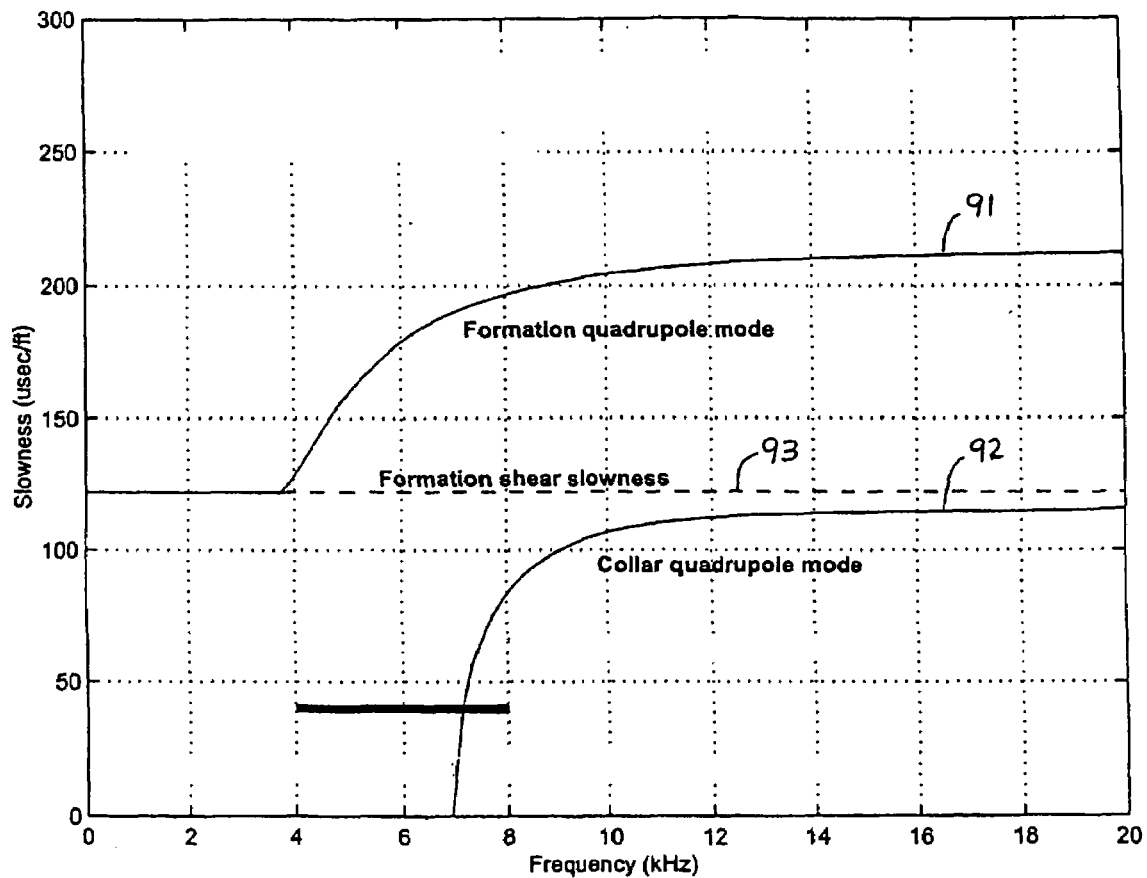
FIG. 9 is a computed graph illustrating the separation of formation mode and collar mode, which is the basis for frequency, slowness, and frequency-slowness domain filtering in the method of the present invention.

FIG. 9 is a computed graph showing formation quadrupole mode slowness 91 µsec/ft (approximately 298 µs/m), and collar quadrupole mode slowness 92 µsec/ft (approximately 302 µs/m) plotted against frequency in kHz in a fluid-filled borehole with a thick collar. Computations were performed using parameters as follows. The borehole has a diameter of approximately 22 cm (8.5 inch). Formation rock has a density of 2200 Kgm$^3$, a compression speed of 4500 m/s, and a shear speed of 2500 m/s. Mud is water-based with a density of 1000 Kgm$^3$, and a speed of 1480 m/s. The collar is made of steel, and has an outside diameter of approximately 18 cm (7 inches) and an inside diameter of approximately 7.5 cm (3 inches).

FIG. 9 illustrates the separation of these two modes on the slowness-frequency plane, which is the basis for frequency domain filtering, slowness domain filtering, and frequency-slowness domain filtering in the method of the present invention. In particular, FIG. 9 shows that collar quadrupole mode cuts off at a relatively high frequency (there is virtually no collar energy below 8 kHz), and that the collar quadrupole mode propagates faster than the formation quadrupole mode. FIG. 9 indicates that the 4-8 kHz frequency band can be used to extract formation shear slowness 93 µsec/ft (approximately 305 µs/m). In slower rock the low frequency limit could be lower than 4 kHz.

The method of the present invention applies DSTC processing or QDSTC processing as taught by Kimball to extract the formation shear slowness. However, the method of the present invention includes "filtering for formation quadrupole mode data" (step 113 of FIG. 7 and step 151 in FIG. 88). These steps take advantage of the benefits of quadrupole excitation discussed above and illustrated in FIG. 9. Steps 113 and 151 are not taught by Kimball.

A first preferred embodiment of the method of the invention uses frequency domain filtering with a pass band of 4 to 8 kHz, as indicated by the thick line shown in FIG. 9, based on collar quadrupole mode cutting off at a higher frequency than formation quadrupole mode. Cut-off above 8 kHz attenuates the collar quadrupole mode energy. Below 4 kHz attenuates the energy of drilling-related noise.

A second embodiment uses slowness filtering, based on collar quadrupole mode propagating faster than the formation quadrupole mode. Slowness filtering is equivalent to time domain windowing, i.e., excluding earlier arrivals of the time domain waveforms. The collar quadrupole mode is faster with a stiffer collar. The greater the collar OD and the smaller the collar ID, the stiffer the collar, and the faster the speed of the collar quadrupole mode. The speed of the collar quadrupole mode limits the range of formation speed that can be measured using slowness filtering.

A third embodiment uses two-dimensional filtering such as slowness-frequency domain filtering. For the example shown in FIG. 9, a filter excludes the subdomain where the frequency is above 8 kHz and the slowness is less than 120 µsec/ft (approximately 394 µs/m). This slowness-frequency domain filtering is equivalent to the frequency-wavenumber (f-k) filtering which is widely used in seismic testing. (See "Seismic Data Processing" Ozdogan Yilmaz, author, 1987, pages 69-79: and U.S. Pat. No. 5,971,095 to Ozbek, issued Oct. 26, 1999).

In an alternative embodiment of the method of the invention, signal data is retrieved from receiver electronics 34 after the drill string is drawn up from the borehole. Then dispersive wave processing is used to process the stored signal data to determine formation shear wave slowness.

What is claimed is:

1. A tool for generating signals indicative of shear wave slowness of the formation surrounding a borehole containing a fluid and a drill string, the tool adapted for use with a drill string having a plurality of drill collars jointed together, the tool comprising:

a collar portion defining an axis and adapted for mounting in a drill string;

a sonic transmitter mounted to the collar portion at a first location, wherein said transmitter excites quadrupole signals as well as other order modes; and a sonic receiver array mounted to the collar portion at a second location, the second location spaced apart from the first location, wherein said receiver is capable of distinguishing quadrupole signals from other order modes.

2. A tool according to claim 1, wherein said transmitter is embedded in an annular groove in said collar portion.

3. A tool according to claim 1, wherein said receiver array includes an axial array of transducers, each transducer embedded in an annular groove in said collar portion.

4. A tool according to claim 1, wherein said transmitter and receiver are adapted for mounting to a thick wall drill collar.

5. A tool according to claim 1, further comprising receiver electronics, mounted within said collar portion, for converting signals indicative of shear wave slowness of the formation into digital data indicative of shear wave slowness of the formation.

6. A tool according to claim 5, wherein said receiver electronics includes means for storing said digital data.

7. A tool according to claim 5, further comprising means for downhole processing and means for transmitting formation shear slowness data to the surface by telemetry.

8. A quadrupole sonic receiver, for use in a tool for generating signals indicative of shear wave slowness of the formation surrounding a borehole containing a fluid and a drill string, the tool adapted for use in a drill string having a plurality of drill collars jointed together, said tool having a collar portion defining an axis, said quadrupole sonic receiver having an azimuthal array of four equally spaced transducer quadrants, each quadrant including at least one electro-acoustical transducer element, wherein said receiver is capable of distinguishing quadrupole signals from other order modes.

9. A receiver according to claim 8, wherein each quadrant includes a quarter-circle array of piezoelectric transducer elements, the elements of the four quadrants collectively arranged as a quadrupole piezoelectric ring transducer.

10. A receiver according to claim 9, wherein each element of each quadrant has a predefined sensitivity profile across the elements of each quarter-circle array, such that the elements of the four quadrants collectively produce an acoustic wave sensitivity that approximates the quadrupole profile of cos 2θ.

11. A receiver according to claim 8, wherein each transducer quadrant includes a stack of piezoelectric elements.

12. A receiver according to claim 8, wherein each transducer quadrant includes at least one pressure balanced backing bender transducer.

13. A receiver according to claim 8, wherein each transducer quadrant includes at least one magnetostrictive transducer.

14. A receiver according to claim 8, wherein each transducer quadrant includes at least one electro-dynamic transducer.

15. A receiver according to claim 8, adapted for embedding within a protective encapsulating material in an annular groove in the collar portion of said tool.

16. A system for determining shear wave slowness of the formation surrounding a borehole, the borehole containing a fluid, the system comprising:
a tool for generating signals indicative of formation shear wave slowness, the tool having a collar portion defining an axis and adapted for mounting in a drill string, a sonic transmitter mounted to the collar portion at a first location, wherein said transmitter excites quadrupole signals as well as other modes, and a quadrupole sonic receiver array mounted to the collar portion at a second location, the second location spaced apart from the first location, wherein said receiver is capable of distinguishing quadrupole signals from other order modes; and
computing means for calculating formation shear wave slowness from said signals.

17. A system according to claim 16, wherein said computing means includes means for dispersive wave processing.

18. A system according to claim 17, wherein said means for dispersive wave processing includes means for dispersive slowness time coherence processing.

19. A method for determining shear wave slowness of the formation surrounding a borehole containing a drill string and a fluid, the method comprising:
propagating quadrupole wave energy into the formation from a first location on the drill string;
detecting quadrupole dispersive waveforms and other order modes at a second location on the drill string at a distance from the first location to obtain digital data indicative of shear wave slowness of the formation;
calculating formation shear wave slowness from said digital data, and
storing said calculated data.

20. A method according to claim 19, wherein calculating formation shear wave slowness includes dispersive wave processing.

21. A method according to claim 20, wherein dispersive wave processing includes dispersive slowness time coherence processing.

22. A method according to claim 19, wherein calculating formation shear wave slowness includes:
a) Fourier transforming at least a portion of said signals to obtain Fourier transformed signals;
b) backpropagating said Fourier transformed signals utilizing a plurality of quadrupole dispersion curves to obtain a plurality of sets of backpropagated signals;
c) stacking said backpropagated signals of each set to provide stacked sets; and
d) using said stacked sets to determine formation shear wave slowness.

23. A method according to claim 22, further using formation quadrupole dispersive waveforms having a range of frequencies whose maximum frequency is approximately equal to the cut-off frequency for collar quadrupole mode propagation.

24. A method according to claim 22, further using formation quadrupole dispersive waveforms having a range of frequencies whose minimum frequency is approximately equal to the frequency at which formation quadrupole mode is expected to propagate at a slowness approximately equal to the formation shear slowness.

25. A method according to claim 22, wherein the preselected range of frequencies is approximately 4-8 kHz.

26. A method according to claim 19, further comprising filtering for formation quadrupole mode data, wherein filtering includes frequency domain filtering.

27. A method according to claim 19, further comprising filtering for formation quadrupole mode data, wherein filtering includes slowness domain filtering.

28. A method according to claim 19, further comprising filtering for formation quadrupole mode data, wherein filtering includes frequency-slowness domain filtering.

* * * * *